United States Patent
Hoffmeister et al.

(10) Patent No.: US 6,542,125 B1
(45) Date of Patent: Apr. 1, 2003

(54) RADIO DEVICE WITH MOVEABLE ANTENNA

(75) Inventors: Markus Hoffmeister, Salzgitter (DE); Jörg Grunewald, Backnang (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,321

(22) PCT Filed: May 6, 1998

(86) PCT No.: PCT/DE98/01238

§ 371 (c)(1),
(2), (4) Date: Mar. 6, 2000

(87) PCT Pub. No.: WO98/56065

PCT Pub. Date: Dec. 10, 1998

(30) Foreign Application Priority Data

Jun. 4, 1997 (DE) .......................... 197 23 331

(51) Int. Cl.⁷ ................................ H01Q 1/24
(52) U.S. Cl. ....................... 343/702; 343/900
(58) Field of Search ............... 343/702, 790, 343/895, 900, 901, 889

(56) References Cited

U.S. PATENT DOCUMENTS

| 4,862,182 A | * | 8/1989 | Egashira | 343/702 |
|---|---|---|---|---|
| 5,255,001 A | | 10/1993 | Tamura et al. | |
| 5,258,772 A | * | 11/1993 | Inanaga et al. | 343/895 |
| 5,852,422 A | * | 12/1998 | Imanishi | 343/702 |
| 5,907,306 A | * | 5/1999 | Karabinis et al. | 343/702 |
| 5,929,814 A | * | 7/1999 | Grossman et al. | 343/702 |
| 5,943,021 A | * | 8/1999 | Hayes et al. | 343/702 |
| 5,969,683 A | * | 10/1999 | Hayes et al. | 343/702 |
| 6,049,699 A | * | 4/2000 | Javitt | 455/66 |

FOREIGN PATENT DOCUMENTS

| JP | 08 191210 | 11/1996 |
|---|---|---|
| WO | 92/09163 | 5/1992 |
| WO | 94/18817 | 8/1994 |
| WO | 95/24746 | 9/1995 |
| WO | 97/02621 | 1/1997 |
| WO | 97/15960 | 5/1997 |

* cited by examiner

*Primary Examiner*—Don Wong
*Assistant Examiner*—Shih-Chao Chen
(74) *Attorney, Agent, or Firm*—Kenyon & Kenyon

(57) ABSTRACT

A radio apparatus is proposed which makes more flexible use of the antenna possible. The radio apparatus includes a case having a listening device on a first side and an antenna element in a second side opposite the first side. The antenna element is movably mounted on the second side of the case. The antenna element has a directional radiation characteristic in at least one first position and an omnidirectional radiation characteristic in at least one second position.

13 Claims, 3 Drawing Sheets

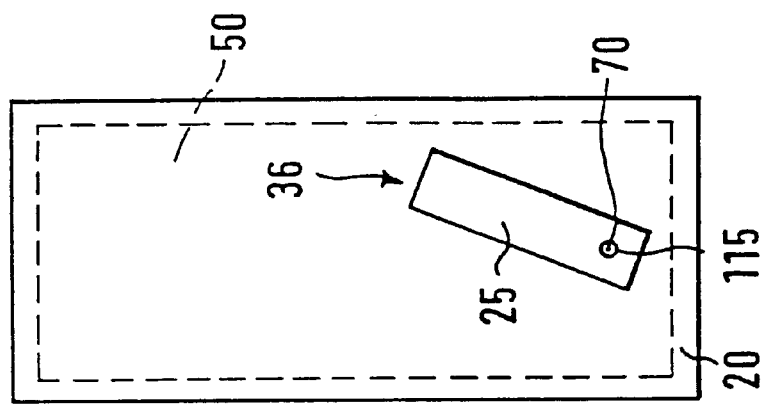
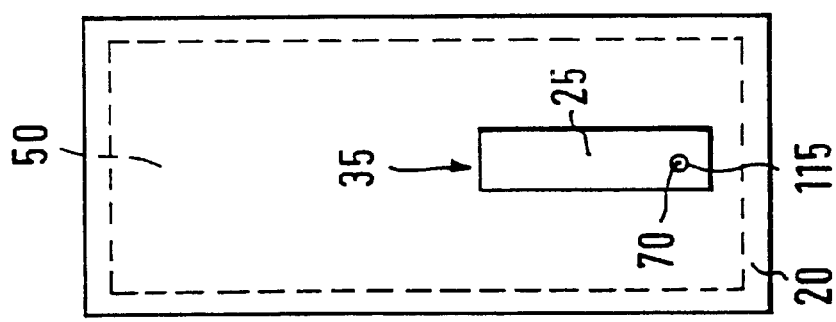
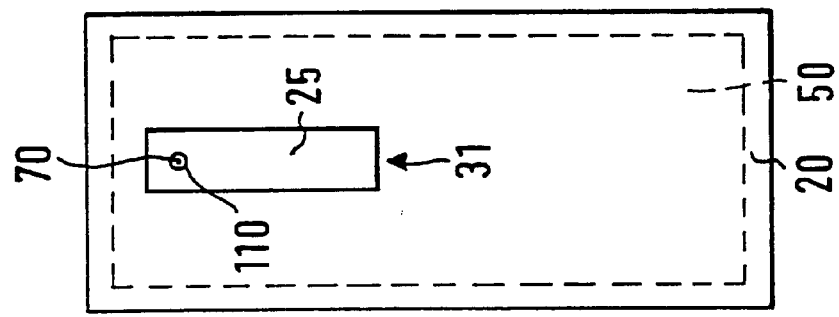
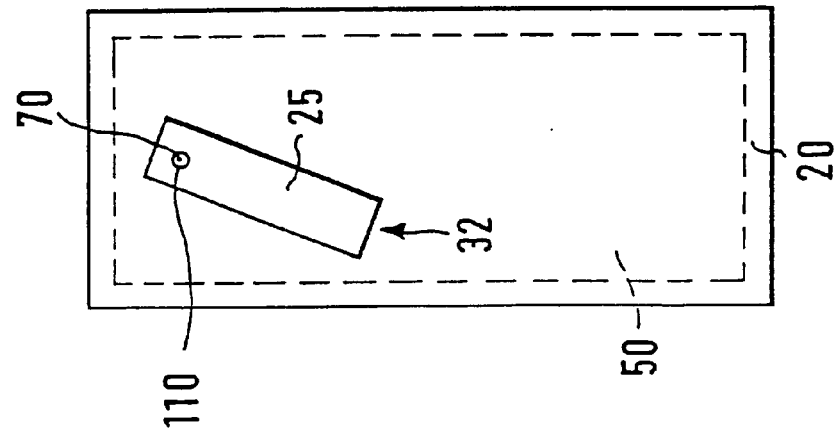

RADIO DEVICE WITH MOVEABLE ANTENNA

BACKGROUND INFORMATION

A conventional hand-held unit for transmitting and/or receiving is described in International Patent Publication No. 95/24746. The unit includes as case.

A hand-held unit for transmitting and/or receiving is already known from World Patent 95/24746. The device includes a case containing an electrical circuit, a listening device on one side of the case, an electrical reference potential surface on the other side of the case opposite the listening device and an antenna resonator element which is arranged approximately parallel to the reference potential surface and one end of which has an electrically conducting connection to the reference potential surface.

SUMMARY OF THE INVENTION

A radio apparatus according to the present invention has the advantage that the antenna element on the case of the radio apparatus can assume various positions. This makes it possible to improve the transmission and/or reception conditions by changing the position of the antenna element. When the antenna element functions as a directional antenna, harmful irradiation of the user's head can be avoided. Due to the positioning of the antenna element on the second side of the case and the shielding by the shielding enclosure, the radiation direction in this case points away from the user's head, resulting in a reduction of irradiation of electromagnetic energy into the user's head. If the technical properties of this antenna element are no longer sufficient for the connection to the base station, the user has the option, by changing the position of the antenna element, of taking advantage of the better characteristics of an omnidirectional antenna the radiation of which is no longer limited by the shielding enclosure. However, as a result, the irradiation into the user's head is increased to a level that is customary for mobile telecommunications devices in widespread use today.

The radio apparatus according to the present invention thus combines the two antenna concepts that are customary today. It offers the user the option of selecting the operating mode best suited to his application situation. In normal operation, the user can benefit from the advantages of the directional antenna with relatively low irradiation into the body; however, under poor transmission conditions, the user has the option of taking advantage of the better radiation characteristics of an omnidirectional monopole antenna standing away from the radio apparatus and consequently obtaining a better connection.

It is advantageous that the antenna element is integrated into a case part which is movably mounted on the second side of the case. In this manner, the antenna element is protected against external influences and damage. In addition, an appropriate design of the shape of the case part can make it possible to facilitate and improve the action of moving the antenna element for the user.

A further advantage is that the impedance of the antenna element can be transformed via various matching circuits which are assigned to different positions. In this manner, the different impedances occurring at different antenna element positions can be optimally matched to the input impedances of the continuing circuits, so that optimum antenna characteristics can be preserved despite different antenna element positions.

A further advantage is that the antenna element can be connected so as to be electrically conductive with a shielding enclosure surrounding the printed circuit board. This represents a particularly simple and inexpensive possibility for implementing a matching circuit.

It is advantageous that the antenna element includes a sliding contact which is in contact with an electrically conductive contact surface on the second side of the case as a function of the position of the antenna element, the contact surface having an electrically conducting connection to the shielding enclosure. A contacting can be easily manufactured in this manner. In addition, the sliding contact may or may not contact the contact surface depending on the position of the antenna element as the result of a suitable arrangement of the contact surface. It is thus possible to implement two different matching circuits in an extremely simple manner.

A further advantage is that the antenna element is movably and/or rotatably mounted in a plane which is essentially parallel to the printed circuit board. This makes it possible for the user to set the antenna element in a plurality of positions, thus making it possible for him always to set an antenna element position that is necessary for optimum transmission and/or reception conditions for many different angles of inclination of his radio apparatus. A rotatable and/or movable mounting of the antenna element also makes easy-to-manufacture contacting possible, for example, via the sliding contact. Thus, the rotatable mounting offers the advantage, for example, that the antenna element may be in a vertical position even if the radio apparatus is tilted in relation to the vertical and it may thus transmit and/or receive in the same polarization as customary base station antennas according, for example, to the GSM standard (Global System for Mobile Communications).

If, for example, vertical linear polarized waves are transmitted and/or received and the radio apparatus with the antenna element is inclined in relation to the vertical, transmission and/or reception losses occur in relation to base station antennas receiving and/or transmitting in the same polarization, as is the case, for example, with the GSM standard. With a suitable radio apparatus, according to the present invention, the antenna element can thus be placed in a position in which the polarization direction is matched to the base station antennas, resulting in reduced transmission and/or reception losses.

A solution that is easy to manufacture is obtained by having one axis of rotation of the antenna element pass through the terminal. In this manner, the mechanical stress of the terminal and of the preferably coaxial connection of the terminal to a transmission and/or reception circuit on the printed circuit board is kept low.

BRIEF DESCRIPTION OF THE DRAWINGS

FIG. 2a shows a first position of an antenna element on the case of the radio apparatus according to the present invention.

FIG. 2b shows a second position of the antenna element on the case of the radio apparatus.

FIG. 2e shows a fifth position of the antenna element on the case of the radio apparatus.

FIG. 2f shows a sixth position of the antenna element on the case of the radio apparatus.

DETAILED DESCRIPTION

Figure 1:
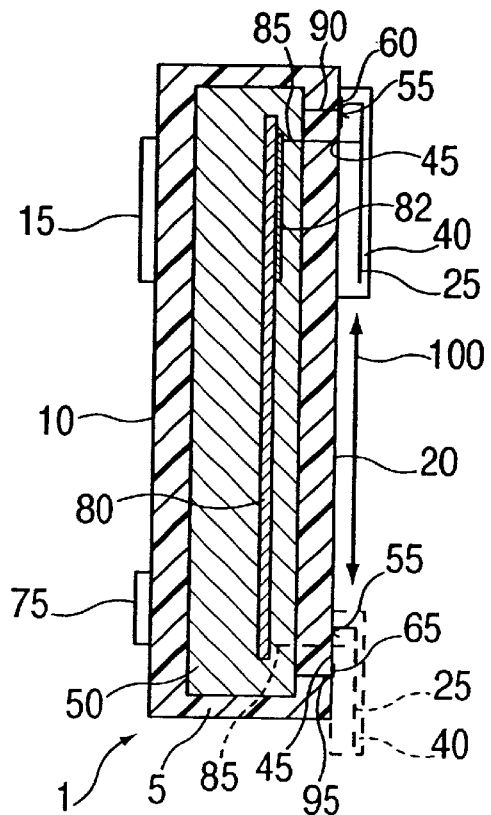
FIG. 1 shows a cross-sectional view of a radio apparatus according to the present invention.

In FIG. 1, a radio apparatus is identified as 1. Radio apparatus 1 may, for example, be a mobile telephone or as a cordless telephone. An electrically non-conducting case 5 has a listening device 15 and a microphone 75 on a first side 10. An electrically conductive metal shielding enclosure 50 is integrated into case 5. Moreover, a printed circuit board 80 shielded against high frequency or radiation and having a transmitter and receiver circuit is integrated into shielding enclosure 50. Depending on the application, only a transmitter circuit or only a receiver circuit may be arranged on printed circuit board 80. Microphone 75 and listening device 15 each have an electrically conducting connection to the circuit on printed circuit board 80, which, however, is not shown in FIG. 1 for reasons of clarity. An electrically non-conductive case part 40 is movably and rotatably mounted on a second side 20 of case 5 opposite first side 10. Case part 40 surrounds an antenna element 25 which is embodied as a rectangular metal plate. A terminal 45 is led away from antenna element 25, the terminal being connected to the circuit on printed circuit board 80 via a connecting lead 85 and via this terminal signals to be transmitted are supplied to antenna element 25 and signals received by antenna element 25 are output to the circuit on printed circuit board 80. Connecting lead 85 is, for example, formed coaxially. Moreover, antenna element 25 has a metal sliding contact 55 at one end via which it can be connected to a first electrically conductive contact surface 60 which is arranged on second side 20 of case 5 and via which a first ground lead 90 has an electrically conducting connection to shielding enclosure 50. In FIG. 1, a double arrow 100 shows that case part 40 with antenna element 25 can be moved longitudinally essentially parallel to the plane of printed circuit board 80 on second side 20 of case 5. Case part 40 with antenna element 25 is in addition essentially parallel to the plane of printed circuit board 80.

It may not be sufficient, however, if antenna element 25 is rotatably mounted to a fixed point and not movably mounted in the corresponding plane.

As shown in to FIG. 1, case part 40 with antenna element 25 is located in a first position in which antenna element 25 is completely shielded against high frequency from first side 10 of case 5 by shielding enclosure 50. Case part 40 is then located in an upper area of radio apparatus 1 and does not project beyond radio apparatus 1. Antenna element 25 is then aligned longitudinally, i.e., not rotated, so that its total length is visible in the cross-section of FIG. 1. In the first position, sliding contact 55 is connected to first contact surface 60. According to a dashed line representation in FIG. 1, case part 40 with antenna element 25 is shown in a second position at the lower end of radio apparatus 1, antenna element 25 projecting downward beyond case 5 of radio apparatus 1 in this second position. In addition, antenna element 25 in the second position shown by dashed lines is rotated in relation to the longitudinal axis so that its full length is not shown in the cross-section of FIG. 1. A second electrically conductive contact surface 65 at the lower end of second side 20 of case 5 has an electrically conducting connection to shielding enclosure 50 via a second ground lead 95. Sliding contact 55, however, is not connected to second contact surface 65 in the second position shown. In this second position, however, it could be connected to an additional contact surface which is not shown in the figures, the contact surface being connected to a matching circuit 82.

Figure 3:
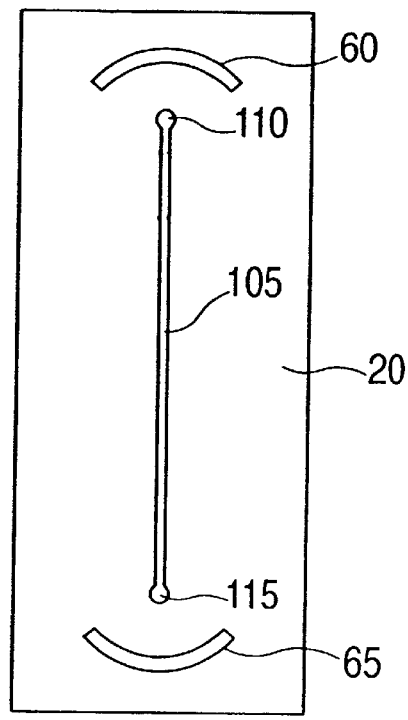
FIG. 3 shows a back view of the radio apparatus according to the present invention, without the antenna element.

A top view of second side 20 of case 5 is shown in FIG. 3. A guide slot 105 having a first end point 110 in the upper area of second side 20 and a second end point 115 in the lower area of second side 20 follows the longitudinal axis of symmetry of second side 20. Above first end point 110, second side 20 has first contact surface 60, which approximately has the shape of a circle segment, the center of the circle being located approximately in first end point 110. Below second end point 115, second side 20 has second contact surface 65 which also approximately has the shape of a circle segment, the center of the circle being located approximately in second end point 115. Terminal 45 and connecting lead 85 are guided within guide rail 105. Four stop positions each can be provided for each of the two end points 110, 115, the stop positions being shown in FIG. 2 and being selected particularly advantageously for the application. Additional stop positions can be provided as needed. The electrically conducting connection of connecting lead 85 to the circuit of printed circuit board 80 can, for example, also be made via a sliding contact. Another possibility is to solder connecting lead 85 on printed circuit board 80 and to provide it with sufficient length so that it is possible to slide antenna element 25 over the entire length of guide slot 105. If the connection of connecting lead 85 to the circuit on printed circuit board 80 is selected approximately in the center of circuit board 80, it is possible to implement a connecting lead 85 that is as short as possible. The snapping of antenna element 25 into the possible stop positions is accomplished in the customary manner known to the person skilled in the art, for example, by spring-loaded stop connections.

Figure 4:
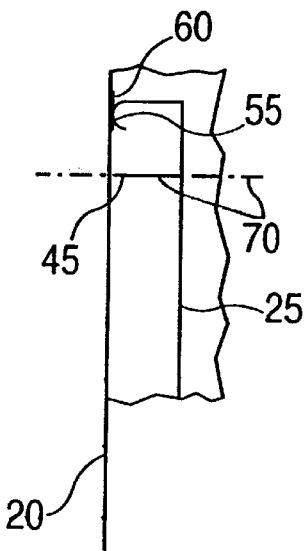
FIG. 4 shows a side view of the antenna element with a sliding contact arranged on a back wall of the case of the radio apparatus according to the present invention.

Antenna element 25 is shown in an enlarged cross-sectional representation in FIG. 4. An axis of rotation 70 passes through terminal 45 of antenna element 25. In this manner, the mechanical stress of connecting lead 85 and of terminal 45 is reduced when antenna element 25 is rotated in guide slot 105. FIG. 4 shows only the enlarged cutout from the cross-sectional representation of FIG. 1 in which the same reference numbers identify the same elements and antenna element 25 is shown in the first position at the upper end of radio apparatus 1.

Figure 2H:
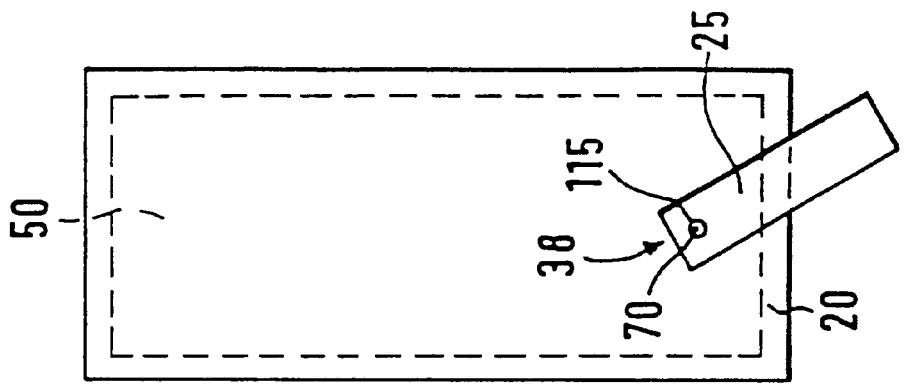
FIG. 2h shows an eighth position of the antenna element on the case of the radio apparatus.
Figure 2G:
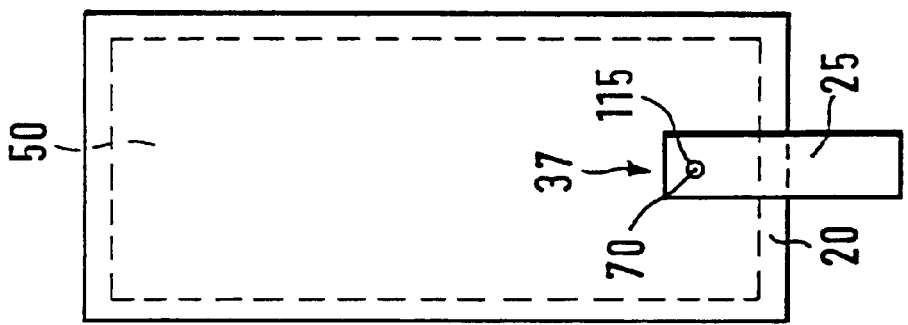
FIG. 2g shows a seventh position of the antenna element on the case of the radio apparatus.
Figure 2D:
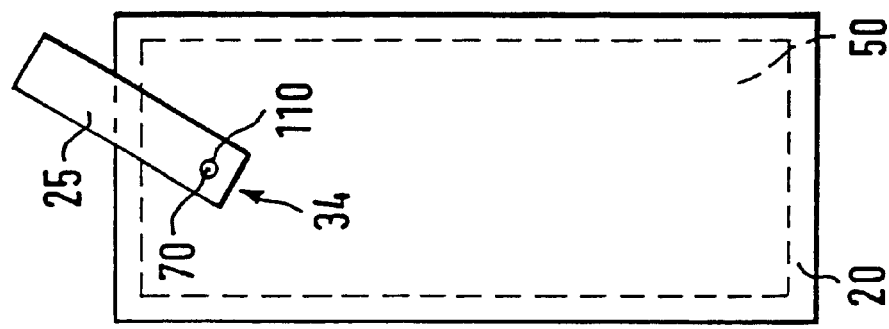
FIG. 2d shows a fourth position of the antenna element on the case of the radio apparatus.
Figure 2C:
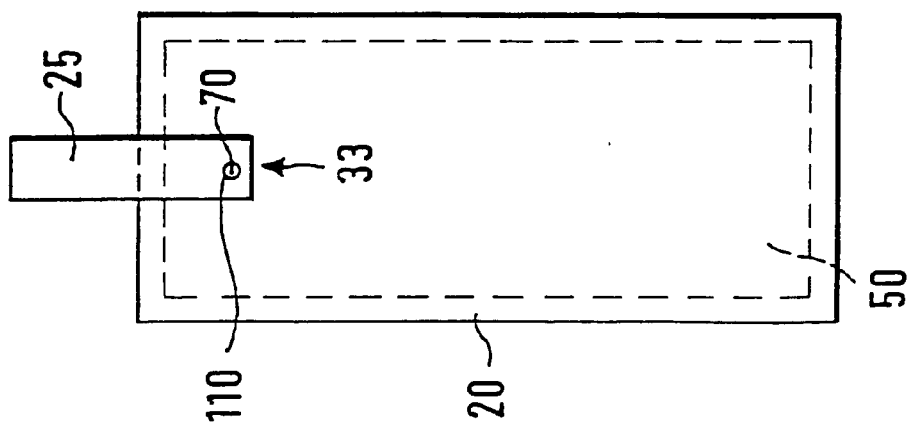
FIG. 2c shows a third position of the antenna element on the case of the radio apparatus.

In FIGS. 2a) to 2h) antenna element 25 is shown in eight different stop positions 31, . . . , 38. As shown in FIGS. 2a)–d), the axis of rotation 70 is located in first end point 110 and according to FIGS. 2e)–h), axis of rotation 70 is located in second end point 115. The shown stop positions 31, . . . , 38 are only exemplary. Additional stop positions can be provided as needed and fewer stop positions than those shown or even no stop positions at all may be implemented. According to FIG. 2a) and FIG. 2b), antenna element 25 is located completely in the area of shielding enclosure 50, which is indicated by the dashed lines, i.e., completely in the area of case 5 of radio apparatus 1. It thus does not project beyond second side 20. Due to shielding enclosure 50 integrated into radio apparatus 1, this results in a directional radiation away from the body of the user during transmission so that only slight radiation into the body and/or head of the user can be expected. However, such operation can only be implemented without interference when transmission conditions are favorable. As shown in FIG. 2a), antenna element 25 is located parallel to the longitudinal axis of symmetry of second side 20 in a first stop position 31. However, if the user utilizes radio apparatus 1 inclined from the vertical, the result is a loss of polarization with vertical linear polarization of the transmission or reception waves, since the base station antennas, for example, transmit and receive vertical linear polarized waves according to the GSM standard. The user can remedy this by bringing antenna element 25 into a second stop position 32 shown in FIG. 2b) which is inclined in relation to the longitudinal axis of symmetry of second side 20 in such a way that vertical linear polarized waves can be transmitted or received again without polarization losses occurring. Antenna element 25 is once again aligned vertically. In this connection, second stop position 32 shown in FIG. 2b) is only shown as an example. In the event that the transmission conditions deteriorate, it is advisable to switch from directional transmission to omnidirectional transmission shown in FIGS. 2c) and 2d). In doing so, antenna element 25 is rotated in such a way that it projects upwards above second side 20 of radio apparatus 1 and thus forms an omnidirectional monopole antenna. In doing so, it is accepted that the radiation into the user's head is increased, however, not above the level emitted by current mobile telephones having omnidirectional monopole antennas in the form of wire antennas or helical antennas. As shown in FIG. 2c), the antenna element is located parallel to the longitudinal axis of symmetry of second side 20 in a third stop position 33. In the event that the user utilizes radio apparatus 1 inclined from the vertical, a fourth stop position 34 is recommended again as shown in FIG. 2b) in which antenna element 25 is inclined in relation to the longitudinal axis of symmetry so that no polarization losses occur. The inclination of antenna element 25 in fourth stop position 34 is also shown in FIG. 2d) as an example. FIGS. 2e)–h) differ from FIGS. 2a)–d) only in that the antenna element was moved from first end point 110 to second end point 115, resulting for reasons of symmetry in the same set of circumstances as shown in FIGS. 2a)–d), since the distance of first end point 110 from the top edge of second side 20 in this exemplary embodiment is selected to be exactly the same size as the distance of second end point 115 from the lower edge of second side 20 and thus the same effects are obtained in principle. In this connection, it is stressed once more that the possible stop positions are not limited to stop positions 31, . . . , 38 shown in FIG. 2 but rather any rotational positions of antenna element 25 may be implemented at any locations on guide slot 105 depending on need and/or user requirement.

In the event that omnidirectional irradiation is selected, antenna element 25 projects beyond shielding enclosure 50 of radio apparatus 1 and sliding contact 55 is no longer in contact with first contact surface 60 and second contact surface 65, respectively. For this purpose, the dimensions of first contact surface 60 and second contact surface 65 must be selected in such a way that sliding contact 55 of antenna element 25 then only makes contact with one of contact surfaces 60, 65 when antenna element 25 is completely covered by shielding enclosure 50. For the case of omnidirectional irradiation, i.e., approximately that of an omnidirectional monopole antenna, the resulting antenna impedance is approximately 50Ω so that an addition matching circuit to a characteristic impedance of 50Ω of connecting lead 85 is not required. However, a suitable matching circuit in radio apparatus 1 could be contacted, if necessary, via an additional contact surface which is not shown. In the case of complete coverage of antenna element 25 by shielding enclosure 50, however, an additional matching circuit to transform the antenna impedance to the characteristic impedance of 50Ω of connecting lead 85 is required. This matching circuit is implemented by the electrically conducting contacting of antenna element 25 via sliding contact 55 and one of contact surfaces 60, 65 with shielding enclosure 50 as a reference potential surface. The measure brings about an inductive matching of the antenna impedance to the characteristic impedance of connecting lead 85. In the event that stop positions are provided between the two end points 110, 115 of guide slot 105, contact surfaces that correspondingly have an electrically conducting connection to shielding enclosure 50 must be arranged there also for sliding contact 55 on second side 20 of radio apparatus 1 in order to bring about the necessary matching of the antenna impedance to the characteristic impedance of connecting lead 85 if antenna element 25 is completely covered by shielding enclosure 50.

In this manner, a different matching circuit is obtained for stop positions in which a directional irradiation takes place in relation to stop positions in which an omnidirectional irradiation takes place.

In addition or as an alternative to a rotational and/or sliding motion, it is also possible to provide for case part 40 with antenna element 25 to be pivotable back and forth between at least two positions lying essentially parallel to printed circuit board 80. With this measure, sliding contacts may still be used for contacting with contact surfaces 60, 65 on antenna element 25.

It may also be provided for antenna element 25 only to be movable in guide slot 105 but not rotatable. In this manner also, it is also possible to implement positions of antenna element 25 with omnidirectional radiation characteristics with antenna element 25 projecting beyond shielding enclosure 50 and with directional radiation characteristics with complete coverage of antenna element 25 by shielding enclosure 50. In that case, at least partially corresponding contact surfaces for sliding contact 55 must be provided along guide slot 105 for the necessary matching of the antenna impedance, the contact surfaces being in contact with a suitable matching circuit or with shielding enclosure 50.

An additional embodiment may also provide that guide slot 105 be designed to be shorter than shown in FIG. 3. The position of second end point 115 may, for example, be selected in such a way that antenna element 25 at second end point 115 may not project downwards beyond case 5, i.e., shielding enclosure 50 of radio apparatus 1.

What is claimed is:

1. A radio apparatus, comprising:
   a listening device;
   an antenna element; and
   a case having a first side and a second side which is situated opposite to the first side,
   wherein the listening device is situated on the first side of the case,
   wherein the antenna element is movably mounted to the second side of the case,
   wherein the antenna element has a directional radiation characteristic in at least one first position and an omnidirectional radiation characteristic in at least one second position, and
   wherein the antenna element extends beyond the second side of the case when the antenna is in the at least one second position.

2. The radio apparatus according to claim 1, further comprising:

a case part movably mounted on the second side of the case, wherein the antenna element is integrated in the case part.

3. The radio apparatus according to claim 1, wherein the antenna element has an impedance which is transformable via matching circuits, the matching circuits being assigned to at least one of the first position and the second position.

4. The radio apparatus according to claim 1, further comprising:

a printed circuit board including at least one of a transmitter circuit and a receiver circuit, wherein the antenna element has a terminal which is connected to at least one of the transmitter circuit and the receiver circuit.

5. The radio apparatus according to claim 4, wherein the terminal of the antenna element is coaxially connected to the at least one of the transmitter circuit and the receiver circuit.

6. The radio apparatus according to claim 4, further comprising:

a shielding enclosure, wherein the antenna element electrically conducts when the shielding enclosure surrounds the printed circuit board.

7. The radio apparatus according to claim 6, wherein the case includes an electrically conductive contact surface which is provided on the second side, and wherein the antenna element includes a sliding contact contacting the electrically conductive contact surface based on at least one of the first position and the second position of the antenna element, the electrically conductive contact surface being connected to the shielding enclosure via an electrically conducting connection.

8. The radio apparatus according to claim 4, wherein the antenna element is rotatably mounted to the second side of the case in a plane, the plane extending in a substantially parallel direction to the printed circuit board.

9. The radio apparatus according to claim 8, wherein the antenna element rotates about a particular axis of rotation which extends through the terminal.

10. The radio apparatus according to claim 4, wherein a movement of the antenna element stoppable so that the antenna element is in at least one of the first position and the second position on the second side of the case.

11. The radio apparatus according to claim 4, wherein the antenna element is pivotable between two positions of the first and second positions so that the antenna element is positioned substantially parallel to the printed circuit board.

12. A radio apparatus, comprising:

a listening device;

an antenna element; and a case having a first side and a second side which is situated opposite to the first side, wherein the listening device is situated on the first side of the case, wherein the antenna element is movably mounted to the second side of the case, wherein the antenna element has a first radiation characteristic in a first position, and a second radiation characteristic in a second position, the first radiation characteristic being substantially different than the second radiation characteristic, the first radiation characteristic being a directional radiation characteristic, the second radiation characteristic being an omnidirectional radiation characteristic, and wherein the antenna element extends beyond the second side of the case when the antenna is in the second position.

13. The radio apparatus according to claim 12, wherein the antenna element does not extend beyond the second side of the case when the antenna is in the first position.

* * * * *

UNITED STATES PATENT AND TRADEMARK OFFICE
CERTIFICATE OF CORRECTION

PATENT NO. : 6,542,125 B1
DATED : April 1, 2003
INVENTOR(S) : Markus Hoffmeister et al.

It is certified that error appears in the above-identified patent and that said Letters Patent is hereby corrected as shown below:

<u>Column 1,</u>
Lines 8-10, please delete "includes as case. A hand-held unit for transmitting and/or receiving is already known from World Patent 95/24746. The device";

<u>Column 13,</u>
Line 21, please change "or radiation" to -- (or radiation) --.

Signed and Sealed this

Ninth Day of March, 2004

JON W. DUDAS
*Acting Director of the United States Patent and Trademark Office*